C. W. STITES.
SAW.
APPLICATION FILED FEB. 4, 1910.

973,231.

Patented Oct. 18, 1910.
2 SHEETS—SHEET 1.

WITNESSES:

INVENTOR
Charles W. Stites
BY
ATTORNEYS

C. W. STITES.
SAW.
APPLICATION FILED FEB. 4, 1910.
973,231.
Patented Oct. 18, 1910.
2 SHEETS—SHEET 2.
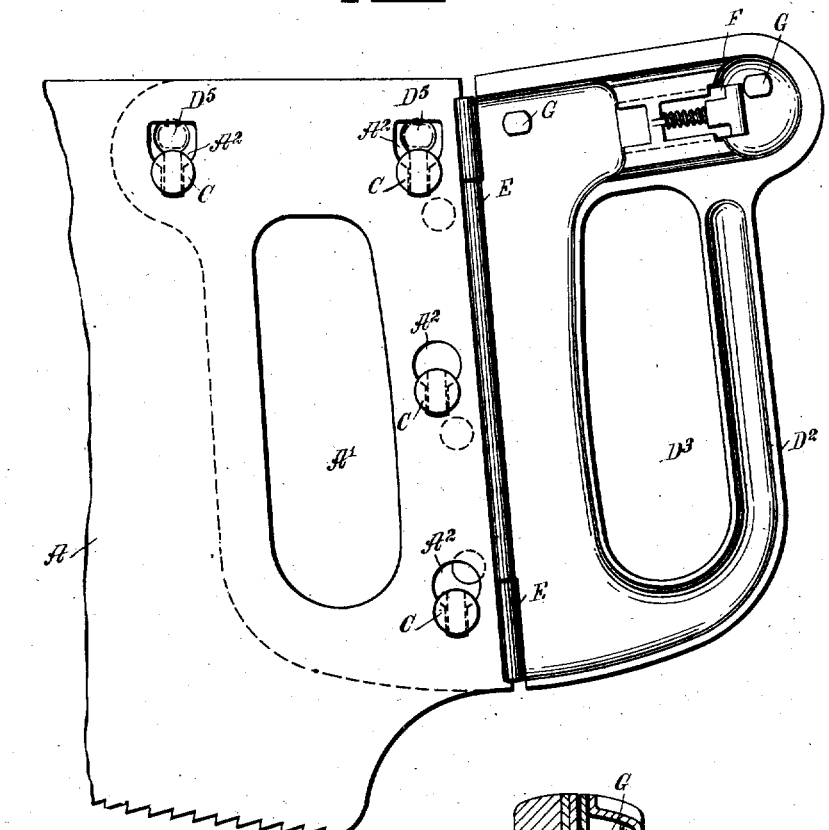
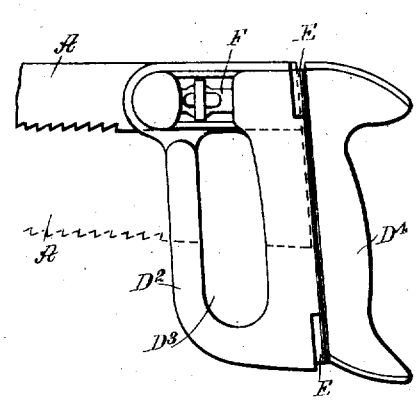
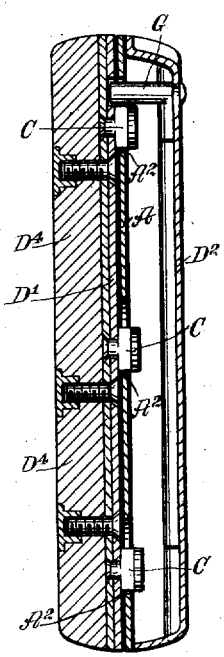
WITNESSES:
INVENTOR
Charles W. Stites
BY
ATTORNEYS

UNITED STATES PATENT OFFICE.

CHARLES W. STITES, OF NEW YORK, N. Y.

SAW.

973,231.  Specification of Letters Patent.  Patented Oct. 18, 1910.

Application filed February 4, 1910. Serial No. 542,132.

*To all whom it may concern:*

Be it known that I, CHARLES W. STITES, a citizen of the United States, and a resident of the city of New York, borough of Manhattan, in the county and State of New York, have invented new and useful Improvements in Saws, of which the following is a full, clear, and exact description.

The object of the invention is to provide certain new and useful improvements in saws, whereby the saw handle can be readily attached to saw blades of different widths, and whereby a portion of the saw blade is utilized to reinforce the handle and to form part thereof. For the purpose mentioned, the saw blade is provided with a hand hold, and the saw handle is made in parts adapted to be removably fastened to the saw blade at opposite sides thereof, the handle parts having hand holds adapted to register with the hand hold in the saw blade.

A practical embodiment of the invention is represented in the accompanying drawings forming a part of this specification, in which similar characters of reference indicate corresponding parts in all the views.

Figure 1:
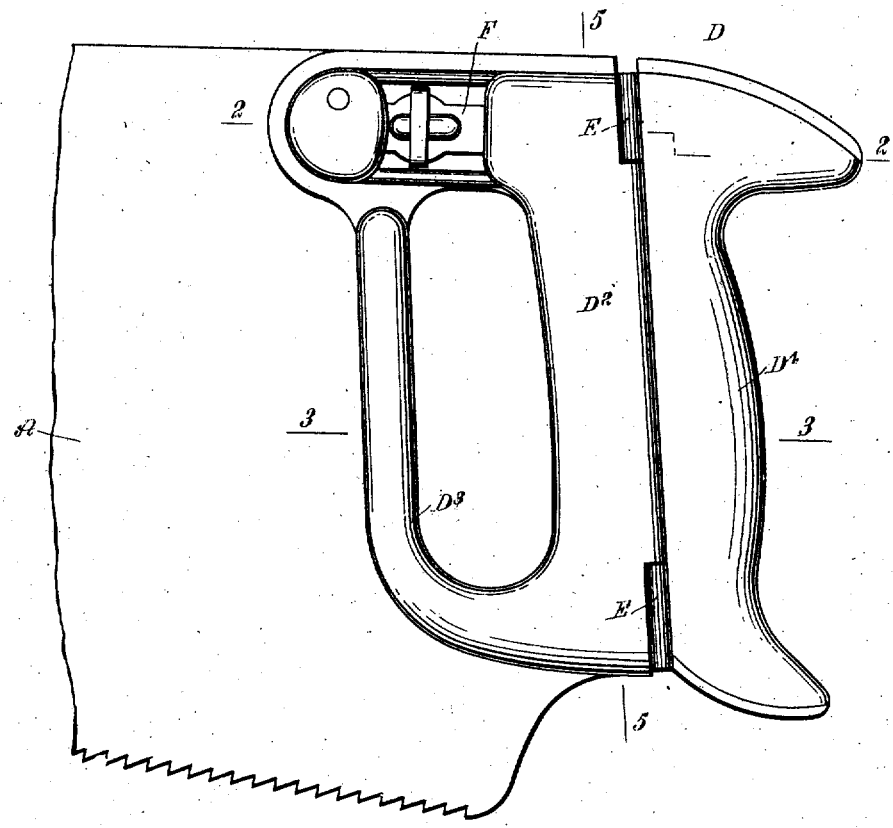
Figure 2:
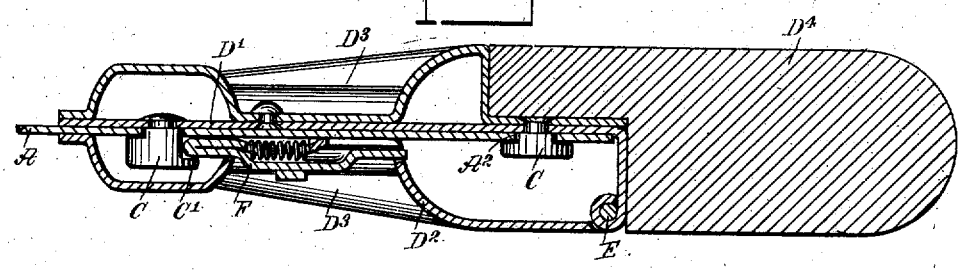
Figure 3:
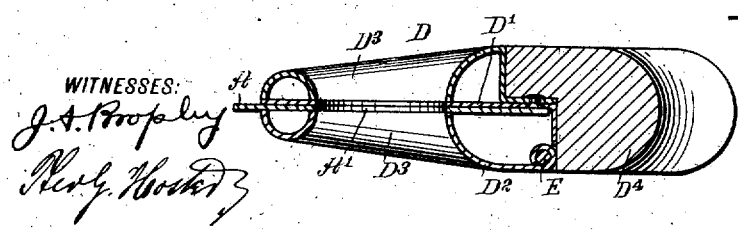

Figure 1 is a side elevation of the handle in position on the saw blade; Fig. 2 is an enlarged sectional plan view of the same on the line 2—2 of Fig. 1; Fig. 3 is a sectional plan view of the same, on the line 3—3 of Fig. 1; Fig. 4 is a side elevation of the same showing one of the handle parts in open position; Fig. 5 is a transverse section of the same on the line 5—5 of Fig. 1; and Fig. 6 is a side elevation of the detachable handle in position on a narrow saw blade.

The saw blade $A$ is provided at its rear end with a hand hold $A^1$ and with keyholes $A^2$ adjacent to the said hand hold $A^1$, as plainly indicated in Fig. 2. The keyholes $A^2$ are adapted to be engaged by studs $C$ projecting from the part $D^1$ of a handle $D$, having a second part $D^2$ connected by a hinge $E$ with the handle part $D^1$, and the said handle parts $D^1$, $D^2$ are provided with hand holds $D^3$, adapted to register with the hand hold $A^1$, whenever the handle parts $D^1$, $D^2$ are in closed position on the saw blade $A$, as indicated in Figs. 1, 2 and 5. The handle parts $D^1$, $D^2$ are so arranged that the handle part $D^1$ engages the right-hand side of the saw blade $A$, while the handle part $D^2$ engages the left-hand side of the saw blade, so that the rear portion of the saw blade extends between the handle parts $D^1$ and $D^2$. On the upper portion of the handle part $D^2$ is arranged a spring-pressed locking bolt $F$, adapted to engage one of the studs $C$, preferably the most forward one, to lock the parts together. The handle part $D^1$ is provided with a wooden back $D^4$, flush at the front face with the adjacent portion of the handle $D^2$, when the latter is in a closed and locked position, it being understood that by the arrangement described the rear portion of the saw blade practically forms part of the handle and reinforces the handle parts $D^1$, $D^2$, and at the same time the handle parts $D^1$ and $D^2$ are securely held in position on the saw blade $A$.

On the inner face of the handle part $D^2$ are arranged studs $G$, adapted to pass through the uppermost keyholes $A^2$ into recesses $D^5$ formed in the inner face of the handle part $D^1$, the said studs $G$ extending over the tops of the two uppermost studs $C$, thus preventing the handle $D$ from upward displacement on the saw blade $A$.

It is understood that the studs $C$ are provided with flattened sides and enlarged heads, of which the latter are adapted to pass through the enlarged upper portions of the keyholes $A^2$, and the flattened sides are adapted subsequently to engage the lower narrow portions of the keyholes $A^2$. Thus when it is desired to place the handle $D$ in position on the saw blade $A$, the handle parts $D^1$ and $D^2$ are held in an open position, as shown in Fig. 4, and then the studs $C$ are engaged with the keyholes $A^2$, as described and shown in Fig. 4, after which the handle part $D^2$ is swung into a closed position, so that the locking bolt $F$ engages the shoulder $C^1$ under the forward stud $C$ (see Fig. 2), and the studs $G$ extend over the tops of the uppermost studs $C$, to lock the handle $D$ against movement, as previously mentioned. The handle parts $D^1$ and $D^2$ are preferably made of stamped metal.

As illustrated in Fig. 6, the handle $D$ is applied to a narrow saw blade, having its hand hold open at the lower edge of the saw blade, but otherwise the construction of the detachable handle and its application to the saw blade are the same as above described, so that further description of the same is not deemed necessary.

Having thus described my invention, I claim as new and desire to secure by Letters Patent:

1. A saw, comprising a saw blade having a hand hold and keyholes adjacent the said hand hold, and a detachable handle made in parts hinged together and having hand holds adapted to register with the said saw blade hand hold, one of the handle parts having studs adapted to engage the said keyholes, the other handle part having a spring-pressed locking bolt adapted to engage one of the said studs to lock the parts together.

2. A saw, comprising a saw blade having a hand hold and keyholes adjacent the said hand hold, and a detachable handle for the said saw blade and made in parts hinged together, the parts having a hand hold adapted to register with the said saw blade, one of the sections being provided with a wooden handle back and with studs adapted to engage the said keyholes and the other handle part having a spring-pressed locking bolt adapted to engage one of the said studs.

3. A saw comprising a blade having a hand hold, a detachable handle made in parts, hinged together and having hand holds adapted to register with the blade hand hold, the blade having openings and one of the handle parts having studs adapted to engage the openings, the other handle part having a spring pressed locking bolt for engaging one of the studs to lock the parts together.

In testimony whereof I have signed my name to this specification in the presence of two subscribing witnesses.

CHARLES W. STITES.

Witnesses:
GEORGE L. WILCOX,
THEO. G. HOSTER.